(12) United States Patent
Katz et al.

(10) Patent No.: US 11,704,580 B2
(45) Date of Patent: Jul. 18, 2023

(54) AUTOMATED COMBINATION OF PREDICTIONS MADE BY DIFFERENT PREDICTION SYSTEMS

(71) Applicant: International Business Machines Corporation, Armonk, NY (US)

(72) Inventors: Yoav Avraham Katz, Zichron Yaacov (IL); Naftali Liberman, Hoshaya (IL); Yoav Kantor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 16/888,738

(22) Filed: May 31, 2020

(65) Prior Publication Data

US 2021/0374565 A1    Dec. 2, 2021

(51) Int. Cl.
  *G06N 5/04*    (2023.01)
  *G06N 20/00*   (2019.01)

(52) U.S. Cl.
  CPC .............. *G06N 5/04* (2013.01); *G06N 20/00* (2019.01)

(58) Field of Classification Search
  None
  See application file for complete search history.

(56) References Cited

U.S. PATENT DOCUMENTS

| | | |
|---|---|---|
| 84,990,082 | 1/2011 | Marco |
| 8,280,828 B2 * | 10/2012 | Perronnin .............. G06N 20/00 706/20 |
| 8,990,149 B2 * | 3/2015 | Danciu .................. G06Q 10/06 703/2 |
| 10,366,053 B1 * | 7/2019 | Zheng ..................... G06N 20/00 |
| 10,824,940 B1 * | 11/2020 | Rybakov .................. G06N 3/08 |
| 11,531,879 B1 * | 12/2022 | Teig .......................... G06N 3/04 |

(Continued)

OTHER PUBLICATIONS

Zhu et al.; Active Learning From Stream Data Using Optimal Weight Classifier Ensemble; 2010; retrieved from the Internet https://ieeexplore.ieee.org/abstract/document/5440901; pp. 1-15, as printed. (Year: 2010).*

(Continued)

*Primary Examiner* — Michael W Chao
(74) *Attorney, Agent, or Firm* — Dvir Gassner

(57) ABSTRACT

Combining predictions made by multiple different prediction systems, including: obtaining a new input sample; obtaining a combiner which comprises optimal selection values that are configured to maximize a predefined performance measure; automatically applying multiple different prediction systems to the new input sample, to generate predictions; and automatically selectively combining the generated predictions based on the optimal selection values, to generate a combined prediction whose predefined performance measure is improved compared to individual usage of each of the prediction systems. The selective combination includes splitting the generated predictions into an intersection subset, fully-disjoint subsets, and optionally one or more partially-disjoint subsets; selecting predictions, from the subsets, at a ratio corresponding to the optimal selection values associated with the subsets, and modifying the subsets to remove all non-selected predictions; and merging all predictions in the modified subsets, to produce the combined prediction.

17 Claims, 3 Drawing Sheets

(56) References Cited

U.S. PATENT DOCUMENTS

| | | | | |
|---|---|---|---|---|
| 11,562,246 | B2* | 1/2023 | Baker | G06N 3/006 |
| 2008/0228680 | A1* | 9/2008 | Chen | G06N 3/0454 |
| | | | | 706/21 |
| 2015/0199333 | A1 | 7/2015 | Nekhay | |
| 2017/0060835 | A1 | 3/2017 | Radford | |
| 2019/0311024 | A1 | 10/2019 | Munro | |
| 2020/0134537 | A1* | 4/2020 | Beason | G06F 16/355 |
| 2020/0327416 | A1* | 10/2020 | Baker | G06N 3/082 |
| 2020/0356904 | A1* | 11/2020 | Jordan | H04L 43/16 |
| 2023/0046655 | A1* | 2/2023 | Hinterstoisser | G06N 20/00 |

OTHER PUBLICATIONS

LeDoux et al.; Improved Malware Classification Through Sensor Fusion Using Disjoint Union; https://www.researchgate.net/profile/Charles-Ledoux/publication/ . . . ; pp. 1-12 as printed. (Year: 2012).*

A. Rozovskaya et al., "Grammatical error correction: Machine translation and classifiers," in Proceedings of the 54th Annual Meeting of the Association for Computational Linguistics (vol. 1: Long Papers), pp. 2205-2215, Berlin, Germany, (Aug. 7-12, 2016).

L. Choshen et al., "Inherent biases in reference-based evaluation for grammatical error correction and text simplification," in Proceedings of the 56th Annual Meeting of the Association for Computational Linguistics (Long Papers), pp. 632-642, Melbourne, Australia (Jul. 15-20, 2018).

L. Choshen et al., "Reference-less measure of faithfulness for grammatical error correction," in Proceedings of NAACL-HLT 2018, pp. 124-129 New Orleans, LA, USA (Jun. 1-6, 2018).

M. Felice et al., "Grammatical error correction using hybrid systems and type filtering," in Proceedings of the 18th Conference on Computational Natural Language Learning: Shared Task, pp. 15-24, Baltimore, MD, USA (Jul. 26-27, 2014).

M. Junczys-Dowmunt et al., "Approaching neural grammatical error correction as a low-resource machine translation task," in Proceedings of NAACL-HLT 2018, pp. 595-606, New Orleans, LA, USA (Jun. 1-6, 2018).

P. Ruiz et al., "Combining open source annotators for entity linking through weighted voting," in Joint Conference on Lexical and Computational Semantics (SEM 2015), pp. 211-215, Denver, CO, USA (Jun. 4-5, 2015).

R. Grundkiewicz et al., "Near human-level performance in grammatical error correction with hybrid machine translation," arXiv:1804. 05945v1 [cs.CL] (Apr. 16, 2018).

R. Jiang et al., "Evaluating and combining name entity recognition systems," in Proceedings of the 6th Named Entity Workshop, pp. 21-27, Berlin, Germany (Aug. 12, 2016).

R. Sennrich et al., "Nematus: a Toolkit for Neural Machine Translation," in Proceedings of the EACL 2017 Software Demonstrations, Valencia, Spain, pp. 65-68 (Apr. 3-7, 2017).

S. Dlugolinsky et al., "Combining Named Entity Recognition Methods for Concept Extraction in Microposts," in #Microposts2014 Workshop Proceedings, Seoul, Korea (Apr. 7, 2014).

* cited by examiner

AUTOMATED COMBINATION OF PREDICTIONS MADE BY DIFFERENT PREDICTION SYSTEMS

BACKGROUND

The invention relates to the field of machine learning systems and other prediction systems.

Numerous types of machine learning systems have been developed over the years. These systems are trained to automatically perform a variety of tasks, such as Grammatical Error Correction (GEC), Named Entity Recognition (NER), POS (Parts-Of-Speech) tagging, sentiment analysis, speech recognition, machine translation, document classification, machine vision, image and video correction, anomaly detection, speaker verification, speaker recognition, medical condition diagnosis, pandemic progression prediction, and many others.

Different machine learning systems trained for the same task often have a varying ability to make accurate predictions of different types. For example, state-of-the-art GEC systems greatly vary in how well they predict different types of grammatical and spelling errors. While some systems are better, for example, at accurately detecting incorrect verb tenses, others excel at detecting incorrect order of words in a sentence. As another example, a certain machine vision system may detect motor vehicles very accurately but perform poorly on person detection, while another machine vision system may exhibit the opposite capability.

Similar to machine learning systems, manually-coded prediction systems are also widely used, with varying degrees of success, to make different types of predictions. For example, a certain manually-coded prediction system may be better at making weather forecasts during the summer than during and the winter, and a different manually-coded prediction system may perform in the opposite manner.

To benefit from both worlds, various techniques have been proposed for jointly utilizing multiple prediction systems. One such technique is pipelining, which involves applying multiple systems sequentially, with each system acting upon the output of the preceding one. Another technique is rescoring (also "reranking"), in which a list of best results from one system is being rescored by another system. A further technique, average ensembling, applies to systems which employ a multiplicity of machine learning models, and involves averaging the probability distributions of these models. All these techniques have their disadvantages.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method comprising operating at least one hardware processor to: obtain a new input sample; obtain a combiner which comprises optimal selection values that are configured to maximize a predefined performance measure; automatically apply multiple different prediction systems, separately, to the new input sample, to generate predictions; and automatically selectively combine the generated predictions based on the optimal selection values, to generate a combined prediction whose predefined performance measure is improved compared to individual usage of each of the prediction systems, wherein the selective combination of the generated predictions comprises: (i) splitting the generated predictions into an intersection subset, fully-disjoint subsets, and optionally one or more partially-disjoint subsets, (ii) selecting predictions, from the subsets, at a ratio corresponding to the optimal selection values associated with the subsets, and modifying the subsets to remove all non-selected predictions, and (iii) merging all predictions in the modified subsets, to produce the combined prediction.

Another embodiment relates to a system comprising: (a) at least one hardware processor; and (b) a non-transitory computer-readable storage medium having program code embodied therewith, the program code executable by said at least one hardware processor to: obtain a new input sample; obtain a combiner which comprises optimal selection values that are configured to maximize a predefined performance measure; automatically apply multiple different prediction systems, separately, to the new input sample, to generate predictions; and automatically selectively combine the generated predictions based on the optimal selection values, to generate a combined prediction whose predefined performance measure is improved compared to individual usage of each of the prediction systems, wherein the selective combination of the generated predictions comprises: (i) splitting the generated predictions into an intersection subset, fully-disjoint subsets, and optionally one or more partially-disjoint subsets, (ii) selecting predictions, from the subsets, at a ratio corresponding to the optimal selection values associated with the subsets, and modifying the subsets to remove all non-selected predictions, and (iii) merging all predictions in the modified subsets, to produce the combined prediction.

A further embodiment relates to a computer program product comprising a non-transitory computer-readable storage medium having program code embodied therewith, the program code executable by at least one hardware processor to: obtain a new input sample; obtain a combiner which comprises optimal selection values that are configured to maximize a predefined performance measure; automatically apply multiple different prediction systems, separately, to the new input sample, to generate predictions; and automatically selectively combine the generated predictions based on the optimal selection values, to generate a combined prediction whose predefined performance measure is improved compared to individual usage of each of the prediction systems, wherein the selective combination of the generated predictions comprises: (i) splitting the generated predictions into an intersection subset, fully-disjoint subsets, and optionally one or more partially-disjoint subsets, (ii) selecting predictions, from the subsets, at a ratio corresponding to the optimal selection values associated with the subsets, and modifying the subsets to remove all non-selected predictions, and (iii) merging all predictions in the modified subsets, to produce the combined prediction.

In some embodiments, the method further comprises, or the program code is further executable for, generating the combiner by automatically: obtaining a development set which comprises input samples and gold predictions, wherein the gold predictions are human-verified predictions of the input samples; applying each of the prediction systems to the input samples, to generate predictions for the input samples; splitting the predictions for the input samples into an intersection subset, fully-disjoint subsets, and optionally one or more partially-disjoint subsets; evaluating prediction performance of each of the subsets of the predictions for the input samples, by comparing each prediction in the gold predictions to a respective prediction in each of the subsets of the predictions for the input samples, wherein the evaluation produces, for each of the subsets of the predictions for the input samples, the following evaluation sets: a true positive set, a false positive set, and a false negative set; instantiating a selection variable for each of the subsets of the predictions for the input samples; and based on the evaluation sets, optimizing values of the selection variables for the predefined performance measure, to generate the optimal selection values.

In some embodiments, said optimization of the values of the selection variables comprises: operating a solver to solve an optimization problem whose constraints are based on the true positive set, the false positive set, and the false negative set.

In some embodiments, each of the optimal selection values is rounded to the nearest one of 0 and 1.

In some embodiments, the predefined performance measure is a measure of quality which considers precision and recall.

In some embodiments, the predefined performance measure is an F score.

In some embodiments, (a) the predictions generated by each of the prediction systems are of different types; (b) in said generation of the combiner: (i) in said evaluation, the comparison of the subsets of the predictions for the input samples is also respective of the different prediction types, such that said evaluation produces the evaluation sets separately for each of the prediction types, (ii) said instantiation is of a selection variable for each of the prediction types in each of the subsets of the predictions for the input samples, (iii) in said optimization, the generated optimal selection values are also respective of the different prediction types; and (c) in said selective combination: said selection of predictions is also respective of the different prediction types.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is an automated technique to intelligently combine predictions made by separate prediction systems, in a way that increases overall quality compared to individual usage of any one of these prediction systems. The technique may be embodied in a method, system, and computer program product.

The present technique is agnostic to the types of prediction systems whose predictions are combined. These prediction systems are regarded as "black boxes" and their intrinsic operation need not be interfered with. These could be machine learning systems, manually-coded prediction systems, or a combination of both.

Given a certain set of prediction systems, the technique first computes what should an optimized combination of their predictions be, such that a performance (or "quality") measure of the combined predictions will satisfy a predefined criterion—for example a certain F score. This computation yields what is referred to herein as a "combiner." The computed combiner may then be used for creating a combined prediction by these prediction systems, by first allowing these systems to individually issue their predictions, followed by selectively combining these predictions by the combiner—according to the previously-computed optimized combination.

The term "prediction system," as used herein, refers to a computer program which receives a certain input (e.g., text, number, vector, matrix, image, video, etc.) and automatically infers a prediction for that input. One variety of prediction systems is machine learning (ML) systems, which make the inference using a model previously trained on samples which are similar in type to the input. For example, these ML systems could be logistic regression systems, naive Bayes systems, nearest neighbor systems, Support Vector Machine (SVM) systems, decision tree systems, boosted tree systems, random forest systems, Artificial Neural Network (ANN) systems, and/or the like. Each such ML system may have been trained to infer predictions for a certain task, such as to classify inputs, annotate (also "tag") inputs (as in many Natural Language Processing (NLP) tasks), generate new data from the inputs, and/or the like. Again, since the ML system are treated here is black boxes, any such system may be utilized in the framework of the present technique. Another type of prediction system is manually-coded prediction systems, which include inference rules that are man-made, as opposed to machine-learned. In either case, the term "prediction" is meant in the sense of "estimation," as known and widely used in the art, and not in the strict sense of "forecasting" a future event.

Figure 1:
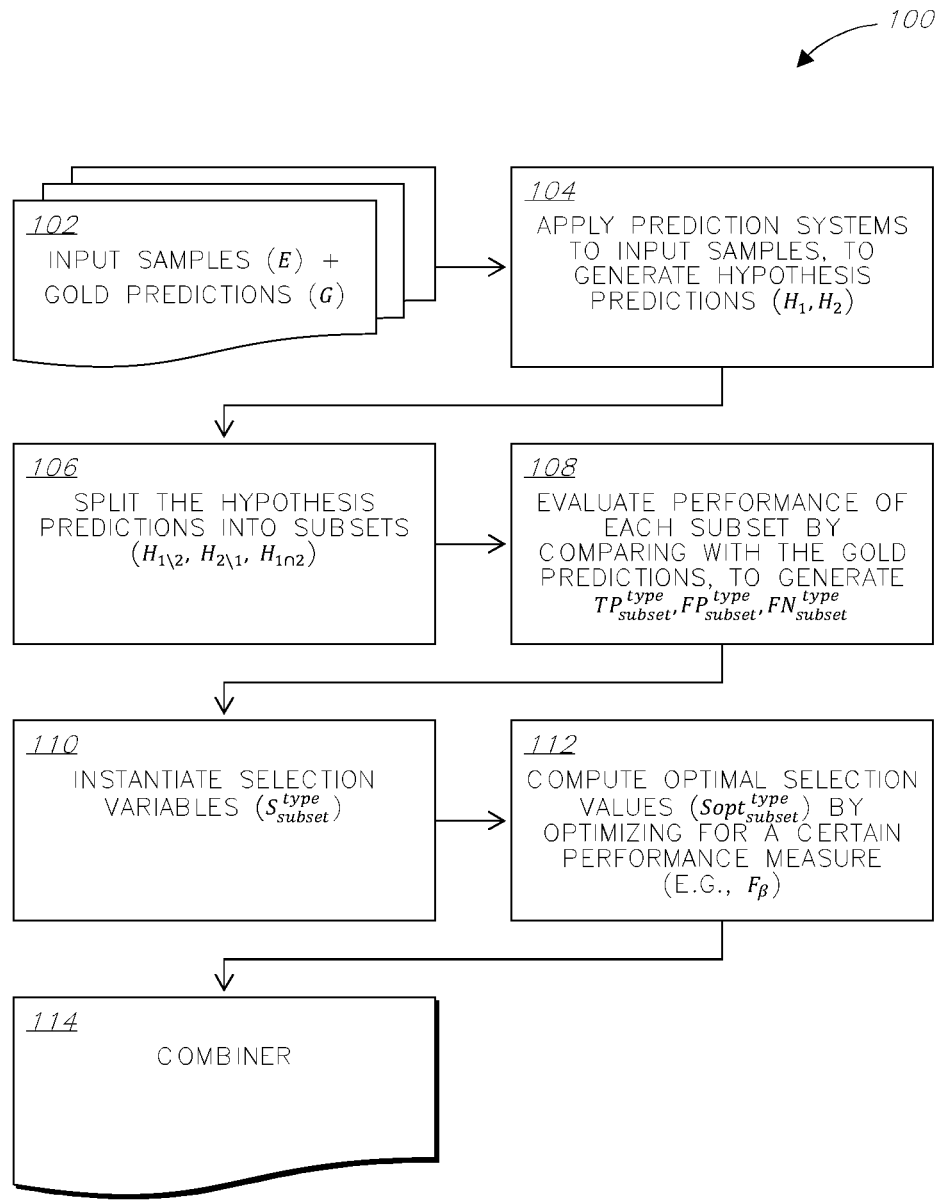
FIG. 1 is a flowchart of a method for computing an optimized combination of predictions of a given set of prediction systems, according to an embodiment.

Reference is now made to FIG. 1, which illustrates a flowchart of a method 100 for generating a combiner 114, namely—computing an optimized combination of predictions of a given set of prediction systems.

Steps of method 100 may either be performed in the order they are presented or in a different order (or even in parallel), as long as the order allows for a necessary input to a certain step to be obtained from an output of an earlier step. In addition, the steps of method 100 are performed automatically, unless specifically stated otherwise.

For reasons of simplicity, method 100 exemplifies the present technique in the context of ML systems that have been trained to perform GEC—an NLP-type task in which texts are annotated with suggested grammatical corrections, and are optionally also automatically corrected according to these suggestions. GEC is also one of the tasks experimented with by the inventors, as discussed in the experimental results section below. Notably, the description of method 100 uses the term "prediction" to refer to the output of each ML system, and although this prediction is often exemplified here as an "annotation" of the GEC type, those of skill in the art will recognize that it may just as well be any type of output by an ML system, such as classification, generation of new data, and/or the like.

In addition, while method 100 refers to a combination of ML systems as an example, the method is just as well applicable for combining manually-coded prediction systems, or for a mixed combination of one or more ML systems with one or more manually-coded prediction systems.

Finally, method 100 discusses a combination of predictions of just two prediction systems—again for reasons of simplicity. The combination of a larger number of prediction systems is certainly possible, and is discussed further below.

In step 102, a development set is obtained, which includes input samples (E) and gold predictions (G). The input samples are, for example, sentences which may include various grammatical errors. The gold predictions (also "ground truth" predictions) are human-verified predictions of the input samples, which are held herein to have perfect precision and recall. For example, in the context of GEC, the gold predictions are grammatical corrections to the input samples, whose accuracy was verified by one or more human experts. For instance, for an input sample "IBM is standing for International Business Machines" the gold prediction may be "IBM stands for International Business Machines," or an annotation of "is standing" as necessitating correction to "stands." The presentation of the prediction as a corrected version of the input or as an annotation/indication of what requires correction and how, is purely an implementation preference which does not affect the principles of method 100.

In step 104, two prediction systems may be separately applied to each of the input samples, to generate hypothesis predictions $H_1$ and $H_2$, respectively. Namely, $H_i$ is a set of predictions which are output by the $i^{th}$ prediction system for all input samples.

In step 106, the hypothesis predictions ($H_1$, $H_2$) may be split into three subsets: The first two subsets are disjoint—a first subset ($H_{1\backslash 2}$) includes only those of the hypothesis predictions made by the first prediction system but not by the second prediction system, and a second subset ($H_{2\backslash 1}$) which includes only those of the hypothesis predictions made by the second prediction system but not by the first prediction system. A third subset, $H_{1\cap 2}$, is an intersection of the hypothesis predictions by the two prediction systems, namely—those hypothesis predictions which are common to these two systems.

In step 108, prediction performance of each of the subsets ($H_{1\backslash 2}$, $H_{2\backslash 1}$, $H_{1\cap 2}$) may be evaluated by comparing the predictions in these subsets to the respective gold predictions (G), to quantify true positive, false positive, and false negative predictions in these subsets. This quantification produces three evaluation sets per subset: a true positive set ($TP_{subset}$), a false positive set ($FP_{subset}$), and a false negative set ($FN_{subset}$), for a total of nine such evaluation sets.

Optionally, if one or more of the prediction systems is of the type which outputs predictions of different types, separate evaluation sets may be produced for the different types of that system's output. This higher level or granularity enables better differentiation between prediction types in which each prediction system excels, and types in which it does not. For example, many GEC systems can predict different types of grammatical errors, such as those relating to punctuation marks, determiners, spelling, tenses, verbs, prepositions, and more. Additional examples are Named-Entity Recognition (NER) which annotates various types of entities (e.g., people, organizations, locations, telephone numbers, etc.) found in a text, or object detection by a machine vision system which detects and labels different types of objects visible in an image (e.g., person, tree, dog, car).

Since the predictions associated with any of the types may be correct or incorrect, this calls for performance evaluation also at the prediction type level. Thus, the number of each of the TP, FP, and FN sets may be a multiple of the number of subsets (H) by the number of prediction types. Merely in order to simplify the following discussion, there are assumed to be two prediction types. Accordingly, the evaluation sets are defined as $TP_{subset}^{type}$, $FP_{subset}^{type}$, and $FN_{subset}^{type}$, with "type" denoting each of the prediction types and "subset" denoting each of the subsets (H). This totals six true positive evaluation sets, six false positive evaluation sets, and six false negative evaluation sets—for a total of 18.

Parenthetically, in more complex scenarios, each prediction type may be further parameterized. For instance, a NER annotation of a "person" entity may also characterize that person by an assumed gender parameter, and an object detection label of a "person" seen in a video may characterize the person by assumed gender, age, height, hair color or similar parameters. Each value prediction for such parameters may be correct or incorrect, and therefore call for more granular performance evaluation—at the parameter level.

In step 110, selection variables ($S_{subset}^{type}$) may be instantiated—one per each combination of subset and prediction type. Assuming, for example, there are six such combinations—a total of six selection variables are instantiated.

Next, in step 112, optimal values (such as between 0 and 1) for the selection variables ($S_{subset}^{type}$) may be computed, by optimizing them for a certain performance measure. The performance measure, in some embodiments, is a certain F score ($F_\beta$, where $\beta$ is a desired value between 0 and 1, such as 0.5 which is customary). F score, as known in the art, is a measure of performance which considers both precision and recall, and is widely used for evaluation of predictions made by ML and other prediction systems. Formally, it is often defined as the harmonic mean of the precision and recall, reaching its best value at 1 (perfect precision and recall).

In other embodiments, the performance measure may refer only to precision, only to recall, or to any combination of precision and recall which is different from the F score measure. Moreover, in further embodiments, the performance may be based on one or more other metrics that are formulated and defined by a user, based on a specific definition by that user of what constitutes accurate prediction performance.

Merely for illustrative reasons, the following discussion refers to a certain $F_\beta$ score as the targeted performance measure.

The following optimization problem (or a mathematical equivalent thereof) may be formulated and solved:

$$0 \le S_{subset}^{type} \le 1$$

$$\text{total} = \sum_{t \in type} TP_{1 \cap 2}^t + FN_{1 \cap 2}^t$$

$$TP = \sum_{t \in type, s \in subset} TP_s^t * S_s^t$$

-continued $$FP = \sum_{t \in type, s \in subset} FP_s^t * S_s^t$$

$$FN = \text{total} - TP$$

$$Sopt = \underset{S}{\text{argmax}}\, f_\beta(TP, FP, FN)$$

This is a convex optimization problem with linear constraints, which may be solved by a conventional solver.

The solution to this optimization problem includes optimal selection values ($Sopt_{subset}^{type}$) for the selection variables ($S_{subset}^{type}$), which are configured to maximize (namely—get closest to) the predefined $F_\beta$.

Each of the optimal selection values ($Sopt_{subset}^{type}$) may be an integer (0 or 1) or a fraction between 0 and 1, depending on the case. It is also possible to round fractions to the nearest integer—0 or 1.

Lastly, the optimal selection values ($Sopt_{subset}^{type}$) may be stored as a "combiner" 114 for future use.

Figure 2:
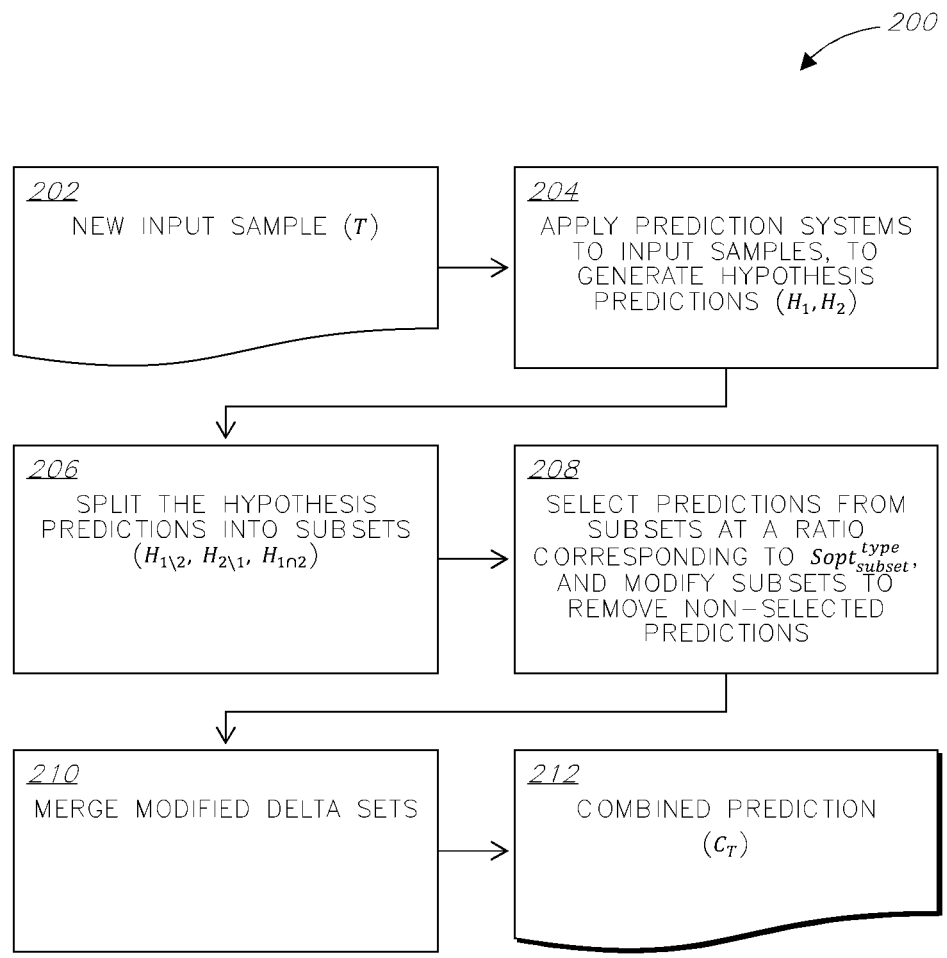
FIG. 2 is a flowchart of a method for combining predictions made by the given set of prediction systems for a new, previously unseen input sample, according to an embodiment.

Reference is now made to FIG. 2, which illustrates a flowchart of a method 200 for using that combiner 114 to combine predictions made by the same prediction systems for a new, previously unseen input sample (T). This combination, advantageously, may exhibit superior performance (e.g., better F score) to mere individual usage of any one of these prediction systems.

Steps of method 200 may either be performed in the order they are presented or in a different order (or even in parallel), as long as the order allows for a necessary input to a certain step to be obtained from an output of an earlier step. In addition, the steps of method 200 are performed automatically, unless specifically stated otherwise.

In step 202, the new, previously unseen input sample (T) may be obtained.

In step 204, the two prediction systems may be separately applied to the input sample (T), to generate hypothesis predictions $H_1$ and $H_2$, respectively.

In step 206, the hypothesis predictions ($H_1$, $H_2$) may be split into three subsets: A first subset, $H_{1 \backslash 2}$, with those of the hypothesis predictions which are exclusive to the first prediction system; a second subset, $H_{2 \backslash 1}$, with those of the hypothesis predictions which are exclusive to the second prediction system; and a third subset, $H_{12}$, with an intersection of the hypothesis predictions by the two prediction systems.

In step 208, the subsets ($H_{1 \backslash 2}$, $H_{2 \backslash 1}$, $H_{1 \cap 2}$) may be analyzed, to select predictions at a ratio corresponding to the optimal selection values ($Sopt_{subset}^{type}$) associated with the subsets. The subsets are then modified, to remove all non-selected predictions. The previously-computed combiner 114 (FIG. 1) is retrieved in order to perform this analysis.

To illustrate the association between prediction in the subsets and the optimal selection values ($Sopt_{subset}^{type}$): $Sopt_{subset1}^{type1}$ is associated with the first subset ($H_{1 \backslash 2}$) and the first prediction type; $Sopt_{subset1}^{type2}$ is associated with the first subset ($H_{1 \backslash 2}$) and the second prediction type; $Sopt_{subset2}^{type1}$ is associated with the second subset ($H_{2 \backslash 1}$) and the first prediction type; and so forth.

In case the optimal selection values ($Sopt_{subset}^{type}$) are binary (such as if the optimal selection values were rounded to 0 or 1 in step 112 of method 100 (FIG. 1)), all predictions in any of these subset-type combinations that are associated with an optimal selection value of 1 are selected, and vice versa. Namely, an optimal selection value of 1 causes selection of 100% of predictions in a subset-type combination, and an optimal selection value of 0 causes selection of 0%. If no rounding is used, and the optimal selection values are allowed to be fractional, then selection of predictions from each subset-type combination is performed at a ratio corresponding to that subset-type combination's associated optimal selection value. For example, if $Sopt_{subset1}^{type1}$ equals 0.3, then 30% of predictions from the first subset ($H_{1 \backslash 2}$) which are of the first prediction type are selected, and the rest removed.

As step 208 concludes for all subsets, modified subsets are provided, which are devoid of the removed, non-selected predictions.

In step 210, all predictions in the modified subsets may be merged. If there are overlapping predictions in two or more modified subsets, a selection mechanism may be used to decide which one of them survives the merging. Overlapping predictions are different predictions (two or more) made for the same part of the input. For example, if the input is a sentence, then two different GEC systems may occasionally predict contradicting spelling corrections to one of the words in that sentence. Assuming that both predictions survived the removal process of step 206, they are both adequate as far as the combiner 114 is concerned. Still, one of the two needs to be discarded. The selection mechanism may either arbitrarily select a survivor (e.g., based on a conventional random selection algorithm), or use a predefined rule for this task. For example, a predefined rule may prefer a prediction made by a system whose known F score (or any other performance measure) is the highest among the prediction systems involved.

The merging of step 210 produces a combined prediction ($C_T$) 212, which combines the best qualities of each of the underlying prediction systems. For example, assuming a GEC task with T="Uspto is standing for United States Patent and Trademark Office", the combined prediction ($C_T$) may be "USPTO stands for United States Patent and Trademark Office"—combining a prediction by a first prediction system which excels at capitalization ("Uspto">"USPTO") but not at figure of speech correction, and a prediction by a second prediction system which excels at figure of speech correction ("standing for">"stands for") but not at capitalization.

In conclusion, method 200 may apply multiple different prediction systems to a new input sample, to generate predictions (steps 202-204). Then, it processes these predictions and selectively combines them based on optimal selection values that are configured to maximize a predefined performance measure (steps 206-210). This generates a combined prediction whose predefined performance measure (e.g., a certain $F_\beta$) is improved compared to individual usage of each of the multiple different prediction systems.

Although methods 100 and 200 (FIGS. 1 and 2, respectively) exemplify the combination of predictions of just two prediction systems, the combination of a larger number of prediction systems is explicitly intended herein. To combine predictions by three or more systems, one of two approaches may be taken:

The first is to perform iterative pair-wise combination: in the first iteration, predictions of two prediction systems are combined; then, in every consecutive iteration, the previous combination is combined with another prediction system, until all prediction systems have been included in the combination. Such iterative process is of course performed separately for generating a combiner according to method 100, and for combining predictions for a new, previously unseen input sample according to method 200.

The second approach is to generate a larger number of disjoint subsets in the pertinent steps of methods 100 and 200, in order to accommodate the larger number of prediction systems. Namely, with N prediction systems, $2^N$ disjoint subsets may be generated, which cover all possibilities of predictions made by one or more of the prediction systems but not by other one or more of the prediction systems. Namely, some of these disjoint subsets will be fully-disjoint (contain predictions made exclusively by a single system), and some will be only partially-disjoint (contain predictions made by two or more systems but not by others). Of course, all subsequent steps of methods 100 and 200 are performed, mutatis mutandis, respective of this larger number of disjoint subsets.

Figure 3:
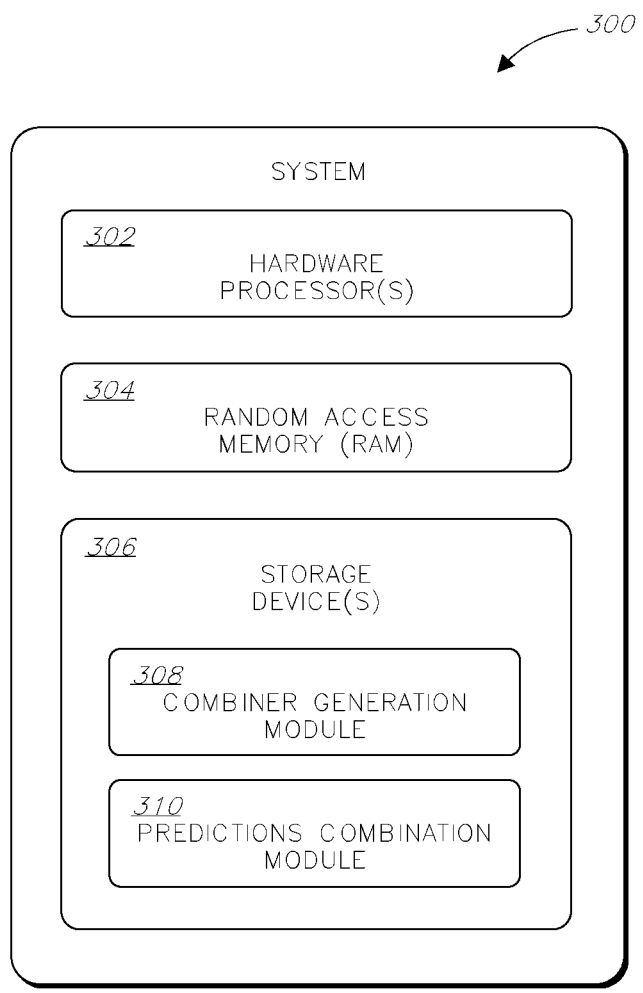
FIG. 3 is a block diagram of an exemplary system for executing the method of any one of FIGS. 1 and 2, according to an embodiment.

Reference is now made to FIG. 3, which shows a block diagram of an exemplary system 300 which may be used to execute any one of method 100 (FIG. 1) and method 200 (FIG. 2), according to respective embodiments.

System 300 may include one or more hardware processor(s) 302, a random-access memory (RAM) 304, and one or more non-transitory computer-readable storage device(s) 106.

Storage device(s) 306 may have stored thereon program instructions and/or components configured to operate hardware processor(s) 302. The program instructions may include one or more software modules, such as a combiner generation module 308 if method 100 (FIG. 1) is to be executed, and a predictions combination module 310 if method 200 (FIG. 2) is to be executed.

The program components may include an operating system having various software components and/or drivers for controlling and managing general system tasks (e.g., memory management, storage device control, power management, etc.), and facilitating communication between various hardware and software components.

System 300 may operate by loading instructions of any one of modules 308 and 310 into RAM 304 as they are being executed by processor(s) 302. The instructions of combiner generation module 308 may cause system 300 to obtain a development set, process it according to method 100 (FIG. 1), and output a combiner. The instructions of predictions combination module 310 may cause system 300 to obtain a new, previously unseen input sample, process it according to method 200 (FIG. 2), and output a combined prediction.

System 300 as described herein is only part of exemplary embodiments of the present invention, and in practice may be implemented in hardware only, software only, or a combination of both hardware and software. System 300 may have more or fewer components and modules than shown, may combine two or more of the components, or may have a different configuration or arrangement of the components. System 300 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 300 may be co-located or distributed, or the system could run as one or more cloud computing "instances," "containers," and/or "virtual machines," as known in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6, etc., as well as individual integers within that range, for example, 1, 2, 3, 4, 5, and 6. This applies regardless of the breadth of the range. For a range narrower than 3, all fractional subranges and fractional values within that range are intended, to a resolution of up to $\frac{1}{10}$ (one tenth).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experimental Results

As reported by the inventors in Y. Kantor et al., "Learning to Combine Grammatical Error Corrections," in Proceedings of the 14$^{th}$ Workshop on Innovative Use of NLP for Building Educational Applications, pages 139-148, Florence, Italy (2019), the present technique to intelligently combine ML predictions of separate ML systems outperforms prominent state-of-the-art GEC systems that are individually used.

The evaluated GEC systems included Nematus (R. Sennrich et al., "Nematus: a Toolkit for Neural Machine Translation," in Proceedings of the Software Demonstrations of the 15$^{th}$ Conference of the European Chapter of the Association for Computational Linguistics, pages 65-68, Valencia, Spain (2017)), BERT (J. Devlin et al., "BERT: Pre-training of Deep Bidirectional Transformers for Language Understanding," arXiv:1810.04805 [cs.CL] (2018)), Language Tool (an open source project by A. Rysin et al., available online at https://languagetool.org, last viewed Apr. 26, 2020), Grammarly (commercially available from Grammarly, Inc., of San Francisco, Calif.), JamSpell (an open source project by F. Ozinov et al., available online at https://github.com/bakwc/JamSpell, last viewed Apr. 26, 2020), and Spellchecker (by Y. Kantor et al., id at § 3.1).

Notably, Nematus and BERT are general-purpose linguistic ML models not immediately usable for GEC. They have been trained to perform GEC tasks for purposes of the experiments reported herein.

Table 1 compares precision, recall, and $F_{0.5}$ performance of four Nematus models that were differently trained, as well as Spellchecker and Bert, versus five iterative combinations of these six systems.

TABLE 1

| System | P | R | $F_{0.5}$ |
|---|---|---|---|
| (1) Nematus1 | 0.4788 | 0.1544 | 0.3371 |
| (2) Nematus2 | 0.4839 | 0.1583 | 0.3429 |
| (3) Nematus3 | 0.4842 | 0.1489 | 0.3338 |
| (4) Nematus4 | 0.4843 | 0.1502 | 0.3352 |
| (5) Spellchecker | 0.5154 | 0.0308 | 0.1242 |
| (6) Bert | 0.0132 | 0.0147 | 0.0135 |
| 1 + 2 | 0.4972 | 0.1854 | 0.3721 |
| 1 + 2 + 3 | 0.5095 | 0.1904 | 0.3816 |
| 1 + 2 + 3 + 4 | 0.4926 | 0.2017 | 0.3824 |
| 1 + 2 + 3 + 4 + 5 | 0.5039 | 0.2233 | 0.4027 |
| 1 + 2 + 3 + 4 + 5 + 6 | 0.5029 | 0.2278 | 0.4051 |

Notably, the F scores of the five combinations were better from those of the six individual systems. Also noticeable is the accumulative benefit of combining more and more systems, as well as the fact that adding even a low-performing system (BERT) to the combination can improve performance.

Table 2 shows a comparison of precision, recall, and $F_{0.5}$ performance of the above-mentioned 1+2+3+4+5+6 combination, Language Tool, Grammarly, and JamSpell, versus three iterative combinations of these four systems.

TABLE 2

| System | P | R | $F_{0.5}$ |
|---|---|---|---|
| (1) Previous 1 + 2 + 3 + 4 + 5 + 6 | 0.5029 | 0.2278 | 0.4051 |
| (2) Language Tool | 0.2699 | 0.0955 | 0.1977 |
| (3) Grammarly | 0.4783 | 0.1825 | 0.3612 |
| (4) Jamspell | 0.423 | 0.0413 | 0.1484 |
| 1 + 2 | 0.5274 | 0.2175 | 0.4105 |
| 1 + 2 + 3 | 0.522 | 0.2656 | 0.4375 |
| 1 + 2 + 3 + 4 | 0.5221 | 0.2641 | 0.4367 |

As seen in the table, further combining the previous 1+2+3+4+5+6 combination with Language Tool, Grammarly, and Jamspell, has made additional contributions to the F scores The present combination technique was also tested against the built-in average ensembling feature of Nematus. That feature enables inference over multiple RNN (Recurrent Neural Network) models by performing geometric averaging of the probability distributions of these individual models. Interestingly, as shown in Table 3, the present technique outperformed also that ensembling feature. This may be explained by the fact that the ensembling improves precision at the cost of reducing recall, while the present technique targets the F score and therefore nicely balances precision and recall improvements.

TABLE 3

| System | P | R | $F_{0.5}$ |
|---|---|---|---|
| (1) Nematus RNN 1 | 0.4676 | 0.1157 | 0.2908 |
| (2) Nematus RNN 2 | 0.4541 | 0.1223 | 0.2944 |
| (3) Nematus RNN 3 | 0.484 | 0.1191 | 0.3002 |
| (4) Nematus RNN 4 | 0.4839 | 0.1184 | 0.2991 |
| 1 + 2 + 3 + 4 ensemble | 0.5577 | 0.1131 | 0.3122 |
| 1 + 2 + 3 + 4 combination | 0.4861 | 0.166 | 0.3508 |

What is claimed is:

1. A method comprising operating at least one hardware processor to:
obtain a new input sample;
obtain a combiner which comprises optimal selection values that are configured to maximize a predefined performance measure, wherein the combiner is generated by automatically:
obtaining a development set which comprises input samples and gold predictions, wherein the gold predictions are human-verified predictions of the input samples,
applying each of the prediction systems to the input samples, to generate predictions for the input samples,
splitting the predictions for the input samples into an intersection subset, fully-disjoint subsets, and optionally one or more partially-disjoint subsets,
evaluating prediction performance of each of the subsets of the predictions for the input samples, by comparing each prediction in the gold predictions to a respective prediction in each of the subsets of the predictions for the input samples, wherein the evaluation produces, for each of the subsets of the predictions for the input samples, the following evaluation sets: a true positive set, a false positive set, and a false negative set,
instantiating a selection variable for each of the subsets of the predictions for the input samples, and
based on the evaluation sets, optimizing values of the selection variables for the predefined performance measure, to generate the optimal selection values;
automatically apply multiple different prediction systems, separately, to the new input sample, to generate predictions, wherein at least one of the multiple different prediction systems is a machine learning system; and
automatically selectively combine the generated predictions based on the optimal selection values, to generate a combined prediction whose predefined performance measure is improved compared to individual usage of each of the prediction systems,
wherein the selective combination of the generated predictions comprises:
splitting the generated predictions into an intersection subset, fully-disjoint subsets, and optionally one or more partially-disjoint subsets,
selecting predictions, from the subsets, at a ratio corresponding to the optimal selection values associated with the subsets, and modifying the subsets to remove all non-selected predictions, and
merging all predictions in the modified subsets, to produce the combined prediction.

2. The method of claim 1, wherein said optimization of the values of the selection variables comprises:
operating a solver to solve an optimization problem whose constraints are based on the true positive set, the false positive set, and the false negative set.

3. The method of claim 1, wherein each of the optimal selection values is rounded to the nearest one of 0 and 1.

4. The method of claim 1, wherein the predefined performance measure is a measure of quality which considers precision and recall.

5. The method of claim 4, wherein the predefined performance measure is an F score.

6. The method of claim 1, wherein:
the predictions generated by each of the prediction systems are of different types;
in said generation of the combiner:
in said evaluation, the comparison of the subsets of the predictions for the input samples is also respective of the different prediction types, such that said evaluation produces the evaluation sets separately for each of the prediction types,
said instantiation is of a selection variable for each of the prediction types in each of the subsets of the predictions for the input samples,
in said optimization, the generated optimal selection values are also respective of the different prediction types; and
in said selective combination:
said selection of predictions is also respective of the different prediction types.

7. A system comprising:
(a) at least one hardware processor; and
(b) a non-transitory computer-readable storage medium having program code embodied therewith, the program code executable by said at least one hardware processor to:
obtain a new input sample;
obtain a combiner which comprises optimal selection values that are configured to maximize a predefined performance measure, wherein the combiner is generated by automatically:

obtaining a development set which comprises input samples and gold predictions, wherein the gold predictions are human-verified predictions of the input samples, applying each of the prediction systems to the input samples, to generate predictions for the input samples, splitting the predictions for the input samples into an intersection subset, fully-disjoint subsets, and optionally one or more partially-disjoint subsets, evaluating prediction performance of each of the subsets of the predictions for the input samples, by comparing each prediction in the gold predictions to a respective prediction in each of the subsets of the predictions for the input samples, wherein the evaluation produces, for each of the subsets of the predictions for the input samples, the following evaluation sets: a true positive set, a false positive set, and a false negative set, instantiating a selection variable for each of the subsets of the predictions for the input samples, and based on the evaluation sets, optimizing values of the selection variables for the predefined performance measure, to generate the optimal selection values;

automatically apply multiple different prediction systems, separately, to the new input sample, to generate predictions, wherein at least one of the multiple different prediction systems is a machine learning system; and automatically selectively combine the generated predictions based on the optimal selection values, to generate a combined prediction whose predefined performance measure is improved compared to individual usage of each of the prediction systems, wherein the selective combination of the generated predictions comprises:

splitting the generated predictions into an intersection subset, fully-disjoint subsets, and optionally one or more partially-disjoint subsets, selecting predictions, from the subsets, at a ratio corresponding to the optimal selection values associated with the subsets, and modifying the subsets to remove all non-selected predictions, and merging all predictions in the modified subsets, to produce the combined prediction.

8. The system of claim 7, wherein said optimization of the values of the selection variables comprises:

operating a solver to solve an optimization problem whose constraints are based on the true positive set, the false positive set, and the false negative set.

9. The system of claim 7, wherein each of the optimal selection values is rounded to the nearest one of 0 and 1.

10. The system of claim 7, wherein the predefined performance measure is a measure of quality which considers precision and recall.

11. The system of claim 10, wherein the predefined performance measure is an F score.

12. The system of claim 7, wherein:
the predictions generated by each of the prediction systems are of different types;
in said generation of the combiner:
in said evaluation, the comparison of the subsets of the predictions for the input samples is also respective of the different prediction types, such that said evaluation produces the evaluation sets separately for each of the prediction types, said instantiation is of a selection variable for each of the prediction types in each of the subsets of the predictions for the input samples, in said optimization, the generated optimal selection values are also respective of the different prediction types; and in said selective combination:
said selection of predictions is also respective of the different prediction types.

13. A computer program product comprising a non-transitory computer-readable storage medium having program code embodied therewith, the program code executable by at least one hardware processor to:

obtain a new input sample;

obtain a combiner which comprises optimal selection values that are configured to maximize a predefined performance measure, wherein the combiner is generated by automatically:

obtaining a development set which comprises input samples and gold predictions, wherein the gold predictions are human-verified predictions of the input samples, applying each of the prediction systems to the input samples, to generate predictions for the input samples, splitting the predictions for the input samples into an intersection subset, fully-disjoint subsets, and optionally one or more partially-disjoint subsets, evaluating prediction performance of each of the subsets of the predictions for the input samples, by comparing each prediction in the gold predictions to a respective prediction in each of the subsets of the predictions for the input samples, wherein the evaluation produces, for each of the subsets of the predictions for the input samples, the following evaluation sets: a true positive set, a false positive set, and a false negative set, instantiating a selection variable for each of the subsets of the predictions for the input samples, and based on the evaluation sets, optimizing values of the selection variables for the predefined performance measure, to generate the optimal selection values;

automatically apply multiple different prediction systems, separately, to the new input sample, to generate predictions, wherein at least one of the multiple different prediction systems is a machine learning system; and automatically selectively combine the generated predictions based on the optimal selection values, to generate a combined prediction whose predefined performance measure is improved compared to individual usage of each of the prediction systems, wherein the selective combination of the generated predictions comprises:

splitting the generated predictions into an intersection subset, fully-disjoint subsets, and optionally one or more partially-disjoint subsets, selecting predictions, from the subsets, at a ratio corresponding to the optimal selection values associated with the subsets, and modifying the subsets to remove all non-selected predictions, and merging all predictions in the modified subsets, to produce the combined prediction.

14. The computer program product of claim 13, wherein said optimization of the values of the selection variables comprises:
  operating a solver to solve an optimization problem whose constraints are based on the true positive set, the false positive set, and the false negative set.

15. The computer program product of claim 13, wherein the predefined performance measure is a measure of quality which considers precision and recall.

16. The computer program product of claim 15, wherein the predefined performance measure is an F score.

17. The computer program product of claim 13, wherein:
  the predictions generated by each of the prediction systems are of different types;
  in said generation of the combiner:
    in said evaluation, the comparison of the subsets of the predictions for the input samples is also respective of the different prediction types, such that said evaluation produces the evaluation sets separately for each of the prediction types,
    said instantiation is of a selection variable for each of the prediction types in each of the subsets of the predictions for the input samples,
    in said optimization, the generated optimal selection values are also respective of the different prediction types; and
  in said selective combination:
    said selection of predictions is also respective of the different prediction types.

* * * * *